United States Patent Office 2,915,532
Patented Dec. 1, 1959

2,915,532

SYNTHESIS OF 3,5-DIHYDROXY-3 METHYLPENTANOIC ACID AND THE DELTA-LACTONE THEREOF

Edward Walton, Scotch Plains, N.J., assignor to Merck & Co., Inc., Rahway, N.J., a corporation of New Jersey No Drawing. Application February 15, 1957
Serial No. 640,341

7 Claims. (Cl. 260—343.5)

This invention relates to the synthesis of racemic 3,5-dihydroxy-3-methylpentanoic acid and the corresponding lactone, β-hydroxy-β-methyl-δ-valerolactone, which exists in equilibrium with the acid in aqueous solution.

The method of the present invention is carried out in three stages comprising (1) reacting 4-benzyloxy-2-butanone with a lower ester of bromoacetic acid to obtain a lower ester of 5-benzyloxy-3-hydroxy-3-methylpentanoic acid, (2) hydrolyzing the ester group of the intermediate to a carboxyl group, and (3) reducing the benzyloxy group to a hydroxy group to obtain 3,5-dihydroxy-3-methylpentanoic acid and the corresponding δ-lactone.

The invention also includes the following new compounds:

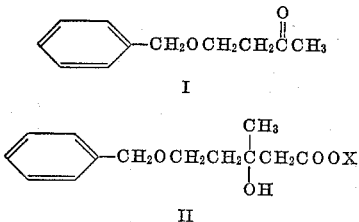

Formula I represents 4-benzyloxy-2-butanone, a reactant in the new synthesis. Formula II, in which X can be hydrogen, a lower alkyl group containing 1 to 6 carbon atoms or DBED/2 (one equivalent of dibenzylethylenediammonium), represents benzyloxy-substituted compounds obtained as intermediates in the synthesis.

The products of the new synthesis, 3,5-dihydroxy-3-methylpentanoic acid and β-hydroxy-β-methyl-δ-valerolactone are useful in minute quantities for promoting the growth of Lactobacillus acidophilus ATCC 4963 and certain other lactobacilli employed in the production of lactic acid and cottage cheese. These compounds are also useful for promoting the growth of chicks. The acid is conveniently employed for these purposes in the form of its salt, N,N'-dibenzyl-ethylendiammonium bis-(3,5-dihydroxy-3-methylpentanoate) although the acid and lactone can be used directly. Growth activity is measured by microbiological assay with Lactobacillus acidophilus ATCC 4963 by techniques essentially in accordance with known procedures. One-half maximal growth of Lactobacillus acidophilus ATCC is obtained when the nutrient medium contains 0.0005 unit of growth activity per ml.

The compounds of the present invention are useful in the preparation of the active compounds referred to above. More specifically, 4-benzyloxy-2-butanone is an essential reactant in the new synthesis of the active acid and lactone. The esters of 5-benzyloxy-3-hydroxy-3-methylpentanoic acid, which are obtained in relatively crude form, are the primary intermediates of the synthesis. Initial purification of these ester intermediates is facilitated by their conversion to 5-benzyloxy-3-hydroxy-3-methylpentanoic acid, a liquid product. The DBED salt of this acid, N,N'-dibenzyl-ethylendiammonium bis-(5-benzyloxy-3-hydroxy-3-methylpentanoate) is useful in obtaining a relatively pure solid crystalline product for conversion to the desired active compounds, 3,5-dihydroxy-3-methylpentanoic acid and the corresponding δ-lactone, which are useful directly or in the form of the DBED salt of the acid for promoting the growth of lactobacilli and chicks.

The first stage of the synthesis, in which 4-benzyloxy-2-butanone is reacted with a lower ester of bromoacetic acid to produce a lower ester of 5-benzyloxy-3-hydroxy-3-methylpentanoic acid, is carried out in a liquid organic reaction solvent in the presence of metallic zinc. The term "lower ester" employed in the specification and claims denotes compounds containing from 1 to 6 carbon atoms in the ester group. I prefer, in this stage of the synthesis, to employ approximately equal molar quantities of reactants and, when ether is the solvent, reflux conditions of temperature and pressure.

In the second stage of the synthesis, the hydrolysis of the lower ester of 5-benzyloxy-3-hydroxy-3-methylpentanoic acid is preferably carried out under basic conditions although mild acidic conditions can be employed. The liquid 5-benzyloxy-3-hydroxy-3-methylpentanoic acid product obtained in this way is preferably purified by converting it to the DBED salt, which is a crystalline product, and then back to the acid.

In the third stage of the synthesis, the conversion of the benzyloxy-substituted acid or DBED salt of Formula II to the desired 3,5-dihydroxy-3-methylpentanoic acid and β-hydroxy-β-methyl-δ-valerolactone, can be accomplished by any suitable reduction method, e.g. by hydrogenolysis of the benzyloxy group over a noble metal catalyst or by reduction of the benzyloxy group with an alkali metal and ammonia or a suitable amine. The active acid-lactone product of the reduction can be obtained in a solid crystalline form as N,N'-dibenzylethylenediammonium bis-(3,5-dihydroxy-3-methylpentanoate).

Although it is preferred to conduct the second and third stages of the new synthesis in the order described above, i.e. hydrolysis of the ester group first and reduction of the benzyloxy group second, it is permissible to reverse the order of these stages and carry out the reduction before the hydrolysis.

The present invention is illustrated in detail by the specific examples below which describe the preparation of the 4-benzyloxy-2-butanone reactant; the synthesis of 3,5-dihydroxy-3-methylpentanoic acid and β-hydroxy-β-methyl-δ-valerolactone and the DBED salt of the acid; and the preparaction of the intermediate benzyloxy-substituted esters, the corresponding acid and its DBED salt.

EXAMPLE I

*Preparation of 4-benzyloxy-2-butanone*

A solution of 90 g. of 4-benzyloxy-2-butanol in 200 ml. af acetic acid was cooled to 10–15° C. and a soultion of 33.3 g. of chromium trioxide in 30 ml. of water and 180 ml. of actic acid was added to the stirred reaction mixture over a period of two hours. The reaction mixture was then diluted with 1 liter of water and extracted with 3 portions of chloroform. The combined chloroform extracts were washed successively with water, aqueous sodium bicarbonate solution and water. The residue obtained after removal of the chloroform was distilled at reduced pressure to yield 4-benzyloxy-2-butanone, B.P. 88–91° C./0.5 mm., $n_D^{28}$ 1.5040.

EXAMPLE II

*Synthesis of 3,5-dihydroxy-3-methylpentanoic acid and β-hydroxy-β-methyl-δ-valerolactone*

(A) *Preparation of ethyl 5-benzyloxy-3-hydroxy-3-methylpentanoate.*—A mixture of 40 g. of 4-benzyloxy-2-butanone and 37.6 g. of ethyl bromoacetate in 100 ml. of ether was added dropwise to 20 g. of clean, dry granular zinc with stirring. The reaction mixture was stirred at the reflux temperature for about two hours and was then added to a mixture of ice and 30 ml. of concentrated hydrochloric acid. The ether layer was separated and the aqueous phase was extracted with ether. The combined ether layers were washed successively with saturated aqueous sodium chloride solution, aqueous sodium bicarbonate solution and, again, with sodium chloride solution. The ether layer was concentrated to a residual oil. A 30 g. portion of the product was distilled in vacuo to give about 15 g. of a by-product boiling below 70° C./0.4 mm. The residue contains the desired product, ethyl 5-benzyloxy-3-hydroxy-3-methylpentanoate, in an impure state. Other lower esters of 5-benzyloxy-3-hydroxy-3-methylpentanoic acid can be prepared as described above by substituting the appropriate methyl, propyl, butyl, pentyl or hexyl alcohol ester of bromoacetic acid for the ethyl ester employed in this example.

(B) *Hydrolysis of ethyl 5-benzyloxy-3-hydroxy-3-methylpentanoate and conversion of the resulting acid to N,N'-dibenzylethylenediammonium bis - (5-benzyloxy-3-hydroxy-3-methylpentanoate).*—The residue (14.7 g.) from the distillation of part A above was hydrolyzed on the steam cone with 22 ml. of 1 N sodium hydroxide and 50 ml. of methanol. The solution was diluted with 50 ml. of water and concentrated at reduced pressure to about a 50-ml. volume. This solution was extracted with ether, acidified with concentrated hydrochloric acid and re-extracted with two portions of ether. These final ether extracts were combined and washed with saturated sodium chloride solution, dried and concentrated to yield 5-benzyloxy-3-hydroxy-3-methylpentanoic acid.

A 1.93 g. portion of the acid was dissolved in 5 ml. of methanol and treated with 0.97 g. of N,N'-dibenzyl-ethylenediamine. When about 75 ml. of ether was added, 1.5 g. of salt, M.P. 123–127° C. crystallized. A 400 mg. portion of the salt was successively recrystalized from chloroform-ether, chloroform-petroleum ether and finally from methanol-ether to yield 200 mg. of N,N'-dibenzylethylenediommonium bis-(5-benzyloxy-3-hydroxy-3 - methylpentanoate), M.P. 131–133° C.

A sample of pure 5-benzyloxy-3-hydroxy-3-methylpentanoic acid was prepared from 480 mg. of N,N'-dibenzylethylenediammonium bis-(5 - benzyloxy-3-hydroxy - 3-methylpentanoate) by suspending the latter in 25 ml. of water and acidifying the suspension with 2.5 N hydrochloric acid. The free acid was extracted into ether and re-extratced into aqueous potassium bicarbonate. The bicarbonate solution was acidified and the product was extracted into ether. The ether extract was washed with water, dried and concentrated to yield 169 mg. of 5-benzyloxy-3 - hydroxy-3 - methylpentanoic acid, $N_D^{25}$ 1.5130; neut. equiv., 243 (calcd. 238).

(C) *Reduction of 5-benzyloxy-3-hydroxy-3-methylpentanoic acid to 3,5-dihydroxy-3-methylpentanoic acid and lactone.*—A solution of 125 mg. of 5-benzyloxy-3-hydroxy-3-methylpentanoic acid in 25 ml. of ether was shaken with 100 mg. of platinum oxide catalyst in an atmosphere of hydrogen for about 16 hours. The reaction mixture was filtered. The filtrate was concentrated to yield a mixture of 3,5-dihydroxy-3-methylpentanoic acid and its lactone.

The reduction can also be accomplished by treating a solution of 100 mg. of 5-benzyloxy-3-hydroxy-3-methylpentanoic acid in 25 ml. of anhydrous ammonia with metallic sodium until a permanent blue color is obtained and then allowing the ammonia to evaporate to give a residue of sodium 3,5-dihydroxy-3-methylpentanoate. This residue is then dissolved in water and treated with 1 N hydrochloric acid equivalent to the sodium used in the reduction. The aqueous solution is lyophilized and the residue of product and sodium chloride is leached with boiling chloroform. Concentration of the chloroform extracts yields a residue of 3,5-dihydroxy-3-methylpentanoic acid and its lactone.

EXAMPLE III

*Preparation of N,N'-dibenzylethylenediammonium bis-(3,5-dihydroxy-3-methylpentanoate)*

The product of the present process, 3,5-dihydroxy-3-methylpentanoic acid, also referred to as mevalonic acid, is advantageously employed in promoting the growth of chicks in the form of its salt with N,N'-dibenzylethylenediamine, also referred to as DBED. This compound is prepared by dissolving the acid in water and treating it with a solution of N,N'-dibenzylethylenediamine in methanol. The resulting mixture is stirred and clarified, if necessary, by the addition of small portions of methanol. The mixure is then concentrated under vacuum with stirring to remove the bulk of the methanol. The aqueous phase is then extracted with chloroform to remove unreacted amine and the extract concentrated under vacuum to yield a salt. This salt is then dissolved in hot methanol and ether is added until the first turbidity appears. Additional ether is added after crystallization begins. The product, DBED salt of mevalonic acid, has a melting point of 124–126° C. DBED salts prepared in this manner normally have an activity of about 40–50 units/mg. when assayed by procedures.

The DBED salt of 3,5-dihydroxy-3-methylpentanoic acid (i.e. mevalonic acid), when used for the promotion of growth in chicks is added to a basal diet in very small amounts. For example, increased growth has been noted in chicks fed on a basal diet supplemented with 20 mg. of DBED salt (having 43 units of activity/mg.) per kg. of final diet. This amounts to only 0.002% of DBED salt in the diet.

The above specific examples of the method and compounds of the present invention are merely illustrative and are not to be construed as limiting the scope of the invention.

I claim:

1. A method for the preparation of 3,5-dihydroxy-3-methylpentanoic acid and β-hydroxy-β-methyl-δ-valerolactone which comprises reacting 4-benzyloxy-2-butanone with a lower alkyl ester of bromoacetic acid in a liquid organic reaction solvent in the presence of metallic zinc to produce a lower ester of 5-benzyloxy-3-hydroxy-3-methylpentanoic acid and converting said ester to 3,5-dihydroxy-3-methylpentanoic acid and β-hydroxy-β-methyl-δ-valerolactone (*a*) by hydrolysis of the ester group and (*b*) by removal of the benzyl group by hydrogenation.

2. A method for the preparation of 3,5-dihydroxy-3-methylpentanoic acid and β-hydroxy-β-methyl-δ-valerolactone which comprises reacting 4-benzyloxy-2-butanone with ethyl bromoacetate in ether solution in the presence of metallic zinc to produce the intermediate ester ethyl 5-benzyloxy-3-hydroxy-3-methylpentanoate, hydrolyzing said ester under basic conditions to produce 5-benzyloxy-3-hydroxy-3-methylpentanoic acid, treating said acid with N,N'-dibenzylethylenediamine and recovering N,N'-dibenzylethylenediammonium bis-(5-benzyloxy-3-hydroxy-3-methylpentanoate) as a crystalline salt from the reacton mixture, converting said crystalline salt to pure 5-benzyloxy-3-hydroxy-3-methylpentanoic acid by treating said crystalline salt with an acid, and removing the benzyl group by hydrogenation of the 5-benzyloxy-3-hydroxy-3-methylpentanoic acid.

3. 4-benzyloxy-2-butanone.

4. A compound selected from the group consisting of (A) 5-benzyloxy-3-hydroxy-3-methylpentanoic acid, (B) lower alkyl 5-benzyloxy-3-hydroxy-3-methylpentanoate, and (C) N,N'-dibenzylethylenediammonium bis-(5-benzyloxy-3-hydroxy-3-methylpentanoate).

5. Ethyl 5-benzyloxy-3-hydroxy-3-methylpentanoate.

6. 5-benzyloxy-3-hydroxy-3-methylpentanoic acid.

7. N,N'-dibenzylethylenediammonium bis-(5-benzyloxy-3-hydroxy-3-methylpentanoate).

References Cited in the file of this patent

UNITED STATES PATENTS 2,356,153   Elderfield et al. _____ Aug. 22, 1944

OTHER REFERENCES

Adkins: React. of Hydrogen, p. 74, Univ. of Wisc. Press (1937).